United States Patent [19]
Gardner

[11] 3,981,002
[45] Sept. 14, 1976

[54] PORTABLE ELECTRONIC DISPLAY DEVICE

[76] Inventor: Mark R. Gardner, Box 2015, Stn. A, Champaign, Ill. 61820

[22] Filed: Mar. 18, 1974

[21] Appl. No.: 452,192

[52] U.S. Cl. .......................... 340/334; 340/323 R; 340/336
[51] Int. Cl.² .......................................... G08B 5/36
[58] Field of Search ........................... 340/323, 334

[56] References Cited
UNITED STATES PATENTS

| | | | |
|---|---|---|---|
| 3,366,945 | 1/1968 | Bowman | 340/323 X |
| 3,638,215 | 1/1972 | Payne | 340/334 X |
| 3,683,357 | 8/1972 | Presnick et al. | 340/323 |
| 3,727,213 | 4/1973 | Kurtenbach | 340/323 |
| 3,838,412 | 9/1974 | Jones et al. | 340/334 |

*Primary Examiner*—David L. Trafton
*Attorney, Agent, or Firm*—David V. Munnis

[57] ABSTRACT

Portable, electronic, indicia display apparatus, for use as a portable scoreboard, clock, and the like for athletic contests, and a portable display for commercial exhibitions, such as trade exhibitions and conventions, comprising (a) a portable remote display member having a panel upon which the desired information in the form of numbers, letters, and other indicia are displayed by a controlled energizing of electrical illumination elements, e.g. light bulbs, and (b) a portable control member, separate and remote from said display member, having a face panel capable of displaying essentially the same or more indicia displayed on the remote member face panel, and containing digital logic circuitry and manual input functions, e.g. switches and buttons, for controlling the indicia display on the remote member and control member face panels, with the system also being provided with a transmitter which transmits information from the control member to the remote display member via serial transmission of binary information. By means of logic circuits in the device of the present invention essentially all of the control circuitry is placed in the portable control member housing to provide a portable display device, useful as a basketball scoreboard and time clock, weighing less than about 75 pounds, and usually less than 50 pounds, for the entire assembly, including auxillary cable, carrying case, and supporting elements.

5 Claims, 18 Drawing Figures

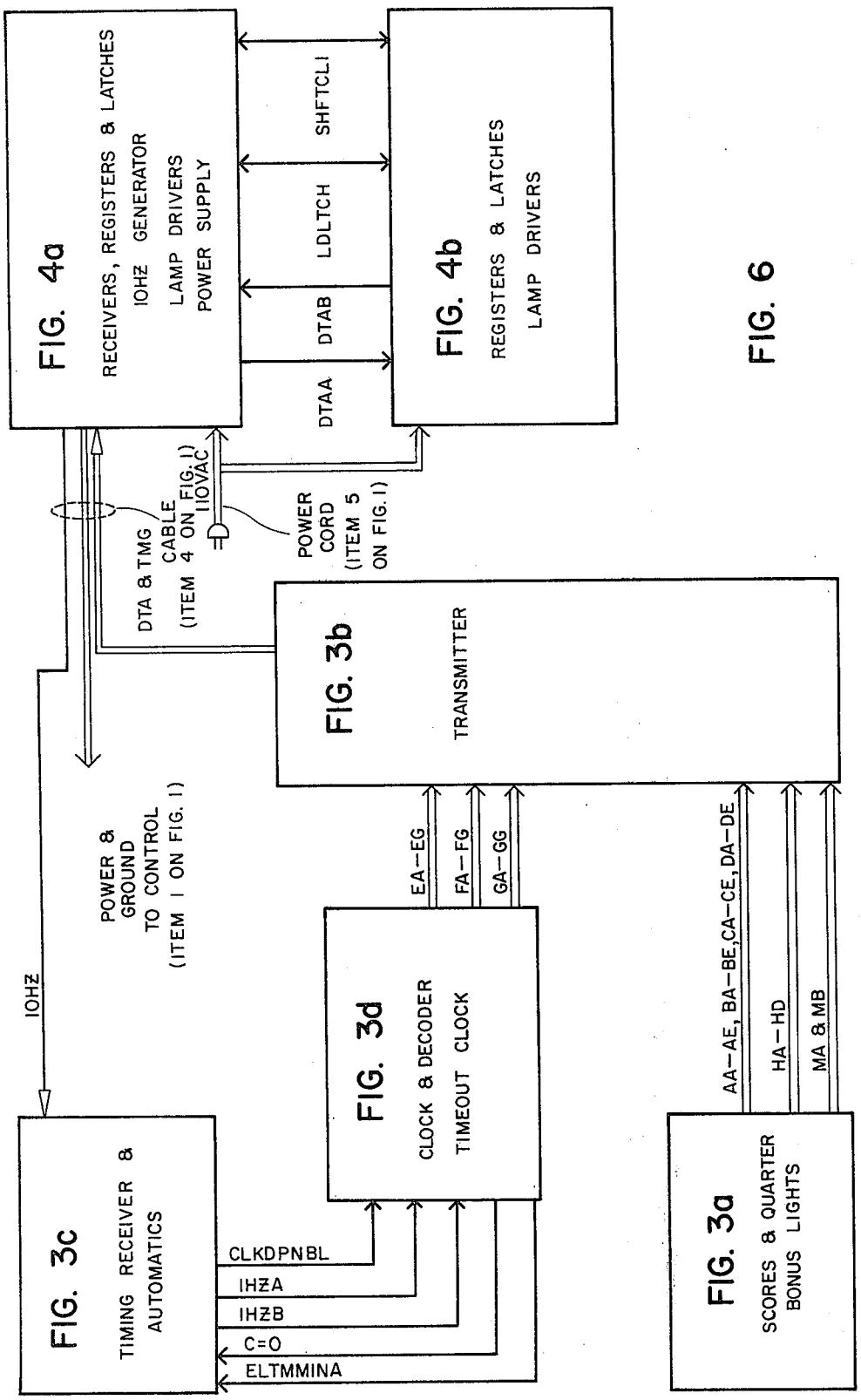

PORTABLE ELECTRONIC DISPLAY DEVICE

BACKGROUND OF THE INVENTION

Indicia display devices for displaying numerals, letters, and other indicia are used widely, for example, in athletic contests as scoreboards and timing clocks, and in commerical displays for trade exhibitions and conventions. In general, such devices previously available are cumbersome, bulky, and, when electrically-actuatable, have further required a complicated array and multiplicity of cabling and wiring means. Prior electrically actuatable display devices, accordingly have proven to be both relatively expensive and difficult to assemble for use. Due to such inherent limitations, therefore, in potential applications such as for essentially "one occurrence" or infrequently occurring events, such as basketball games, wrestling meets, track meets, swimming meets, and the like organized by relatively small prep schools, colleges, churches, parks, and commerically sponsored groups, often, and in the great majority of instances, have had to forego the utilization of a display device indicating scoring and timing to the participants and spectators attending such events.

Accordingly, a significant demand, among such organizations, has existed for a relatively inexpensive, efficient display device adapted for use at such events, which also is sufficiently portable and simple enough to install and operate that it could be feasibly purchased or rented and could be transported to the event site, installed, and operated, all by a single person not having any special training.

OBJECTS OF THE INVENTION

Accordingly, it is the primary object of the present invention to provide a remote display panel-containing display device for indicia such a numbers, and letters, which is adapted for use in a wider-range of applications than indicia display devices heretofore available.

Another object of the present invention, is to provide a remote display panel-containing display device, which is sufficiently portable that the entire device including remote display member, control member, and all auxiliary elements of the display device, such as carrying cases, wiring and cabling, and the like, weighs less than about 75 pounds, e.g., less than about 50 pounds, and is portable enough to be easily carried by one person.

A further object of the present invention is to provide a portable display device, useful as a scoreboard and timing clock for athletic contests, e.g. basketball games, which is adapted to be easily carried to the game site, assembled, and operated all by one person, without any requirement of that person having any special training.

An additional object of the present invention is to provide a portable display device, useful as a scoreboard and timing clock for athletic contests, e.g., basketball games, which is sufficiently portable, inexpensive, and simple to install and operate that is readily adapted for use by small prep schools, colleges, churches, parks, and commercially sponsored groups.

Yet another object of the present invention is to provide a portable remote display panel-containing indicia display device having a control member on which also are displayed all of the indicia displayed on the remote display panel, thus eliminating a need for an operator of the device to see the remote display panel.

DESCRIPTION OF EMBODIMENTS OF THE PRESENT INVENTION

The above-stated and other objects are accomplished and are features of the portable remote display panel-containing display device of the present invention. These objects are achieved by the electronics of the control device of the present invention being constructed almost exclusively from T.T.L. (transistor-transistor logic) integrated circuits and the system design including means for serial transmission of data. Broadly described, to accomplish these objects and to provide a display device having such features, the present invention embodies a portable display device comprising 1. a portable control member comprising a housing, a face panel on said housing, and a plurality of stationary electrically actuatable illumination elements adjacent to said face panel, said illumination elements being adapted, when energized to illuminate pre-determined segment areas, indicia visible on said panel face, 2. a portable, remote display member comprising a housing, a face panel on said housing, and a plurality of stationary electrically actuatable illumination elements adjacent to said face panel, said remote display illumination elements being adapted, when energized, to illuminate pre-determined segment areas of said remote display face panel to define, by a combination of said illuminated segment areas, indicia identical to selected indicia displayed on said control member face panel, 3. first power circuit means having an output to said control member comprising a pulse having a frequency providing a timer signal, 4. second power circuit means having an output to said control member comprising a pulse providing a binary data-carrying signal, 5. circuit means, positioned in said control member, including:

a. timer signal counter circuits adapted to receive an input signal from said timer circuit, and containing means for a binary counting of input signals thereto, and being adapted, on signal, to output the binary data in the counter means thereof, b. a plurality of separate data signal counter circuits, each of said data counter circuits being adapted to receive an input signal from said second power circuit, each of said data signal counter circuits comprising means for the binary counting of the input signals thereto, and being adapted, on signal, to output simultaneously signals corresponding to the binary data in the counters thereof, c. decoding circuits adapted to receive output signals from said data signal counter circuits, said decoding circuits including re-coding circuits for converting signals received from said data signal counter circuits into re-coded binary data for which the segment illumination pattern-coding of said illumination elements in said face panel of said control member and remote display member produce indicia corresponding to set values of output signals from said data signal counter circuits, said decoding circuits being adapted, on signal, to output simultaneously signals corresponding to said decoded binary data, d. first latch circuits, said first latch circuits being adapted, to receive and store separately binary information transmitted thereto by simultaneous input signals and being responsive, on signal, to serially output signals corresponding to binary data stored therein, as a data chain having a bit length corresponding to the number of said stored data bits therein, e. illumination element driving circuits adapted for receiving output signals from said decoding circuits, and, on signal, effecting the energizing of said illumination elements in said control member face panel, 6. on-off manual switch means, positioned on the face panel of said control member for energizing and de-energizing each of said first power circuit, said second power circuit, said timer signal counter circuits, and said data signal counter circuits, 7. circuit means, positioned in said remote display member comprising:

a. signal receiver-register circuits adapted to receive and store separately information transmitted thereto in serial binary pulse bits, said signal receiver-register circuits to sense a peculiar signal indicating a receipt thereby of a complete binary data chain, and thereupon, to output binary data bits stored therein with simultaneous signals, b. second latch circuits adapted to receive and store binary data bits, said second latch circuit means being adapted to receive on signal, simultaneous output signals of said signal receiver-register circuits and being adapted on signal, to output simultaneously signals corresponding to the binary data stored therein, c. illumination element driving circuits adapted for receiving output signals from said second latch circuits and, on signal, effecting and energizing of illumination elements in said remote member face panel, 8. transmitter means for simultaneous transitting timing signals to said signal receiver-register circuits, and, by serial transmission, binary data containing output signals from said first latch circuits to said signal receiver-register circuits, said transmitter transmitting a peculiar combination of said timing signals, and said binary data-containing signal, when said serial transmission is complete to effect signal outputs from said signal receiver-register circuits.

Briefly described, the elements of the display device of the invention, include a display device used for illuminated information display at a point remote from a control site, a control member, separate from the remote display member, used to control the information display on the latter, a principal power source, and a serial binary data transmitter to provide either a closed electrical link or a radio link, between the information output circuits of the control member and the data input circuits of the remote display member. In accordance with the display device of the present invention, all manual functions of the display and all automatic features are controlled from the control element, which has its own information display panel. This latter feature relieves the need of the operator of the display device to have to look at the panel of the remote display at any time during the operation of the display devices. A further feature of the display device of the present invention is that all of the circuitry which one might associate with the functioning of a display device is located and positioned within the housing of the control member.

This is accomplished in the display device of the present invention by circuitry in the control element being provided which (a) receives information from the control logic and manual control buttons and switches on the control element face, (b) converts such information into coded pulses recognizable by energizing elements in both the control member and the remote display member to illuminate elements adjacent to the face panels thereof to form illuminated patterns corresponding to the indicia desired to be displayed, (c) latches, stores, and outputs such coded data to the energizing elements of the control face panel illumination elements, and (d) provides an output signal of the coded data to a transmitter adapted to transmit such coded data in the form of serial binary data bits to receiving circuits in the remote display member housing.

In the remote member housing, circuits are provided which are adapted to receive and store the serially transmitted data bits, latch and store coded information when a complete string of data bits are transmitted to the display member, and energize the energizing elements therewithin to drive and illuminate the remote panel illumination elements in the desired indicia display patterns.

Transmission of coded data bits from the control member to the remote display member is achieved either through a closed electrical connection therebetween via an extension cable or by a radio wave transmitter-receiver linkage between the control member and the remote display member.

In the present device, a timing signal is generated and employed in conjunction with binary data-conveying signals to control transmission and storage of coded data for the illumination display elements and, through the cyclic repetition of the display data stored in the data latches 501–508, constantly correct any error in the display due to "noise" and the like.

In the preferred embodiments of the device of the present invention, binary data-bearing pulses are manually or automatically generated and counted in control member circuitry, utilizing as the counter means conventional decade counters, B.C.D.-encoded, the output of which has been converted into display code, e.g. as decimal numbers, by decoder circuit means, e.g. B.C.D.-to-7-segment decoders. Such encoded data, e.g., 7-segment data, is then latched in control member circuitry into a binary shift register string, along with any miscellaneous non-counter binary data desired to be displayed. A transmitter circuit shifts the resultant binary data string one bit at a time, sending the resultant serial data string by cable or by radio wave, to register-receiver circuits in the remote display member. A cyclic timing signal generated in the control member circuitry and such digital timing data is transmitted simultaneously to the display member register-receiver circuits. When a completed data string transmission has been transmitted, a special joint condition, e.g., an overlapping, of the timing and coded data signals becomes generated and is sensed by the display member receiver-register circuits, and display member illumination element circuitry receives encoded binary data for display and the receiver-register circuits prepare to receive a new data string.

The same data which is sent and transmitted to the display member circuitry is stored in the control member and made available to illumination elements on the control member panel to provide a local display on the control member visible to the operator.

The device of the present invention will be understood more fully by reference to the following detailed description of a specific embodiment thereof given with reference to the attached drawings of which:

FIGS. 4a, and 4b circuit diagrams of the remote display member circuits.

Figure 5A:
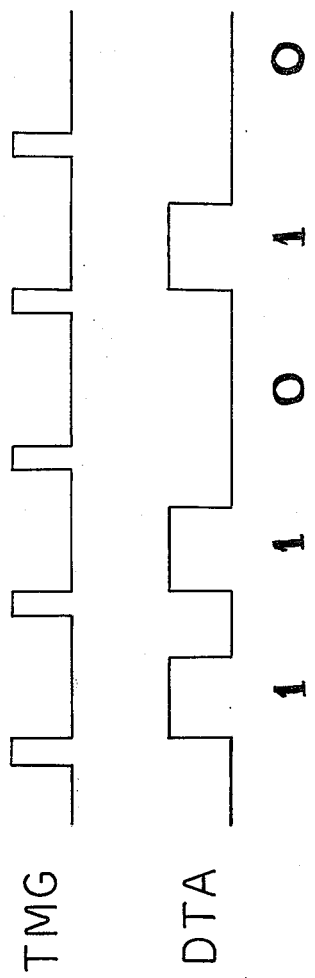

FIG. 5a is a timing diagram showing the relation between clocking pulses and data pulses received as input to the remote display element of the device of the present invention during a signal transmission cycle.

Figure 5B:
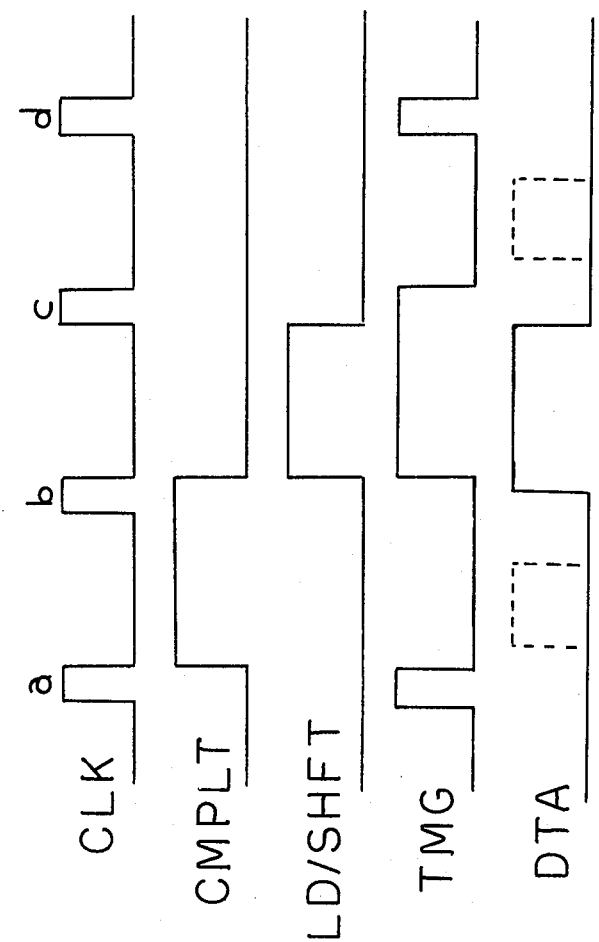

FIG. 5b is a timing diagram of selected signals generated in the operation of the device of the present invention and employed to signal and control desired data display.

Figure 6A:
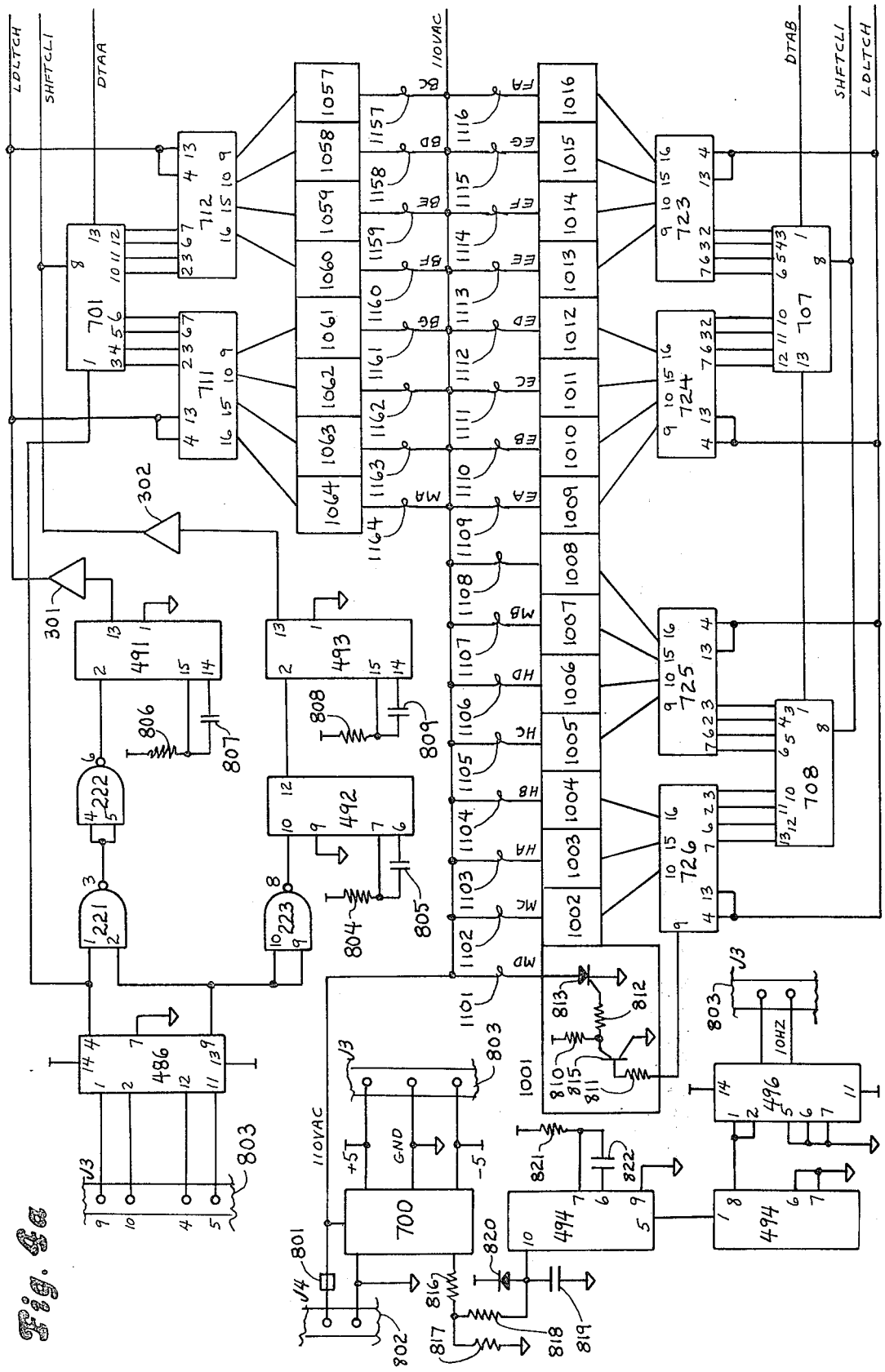
Figure 6B:
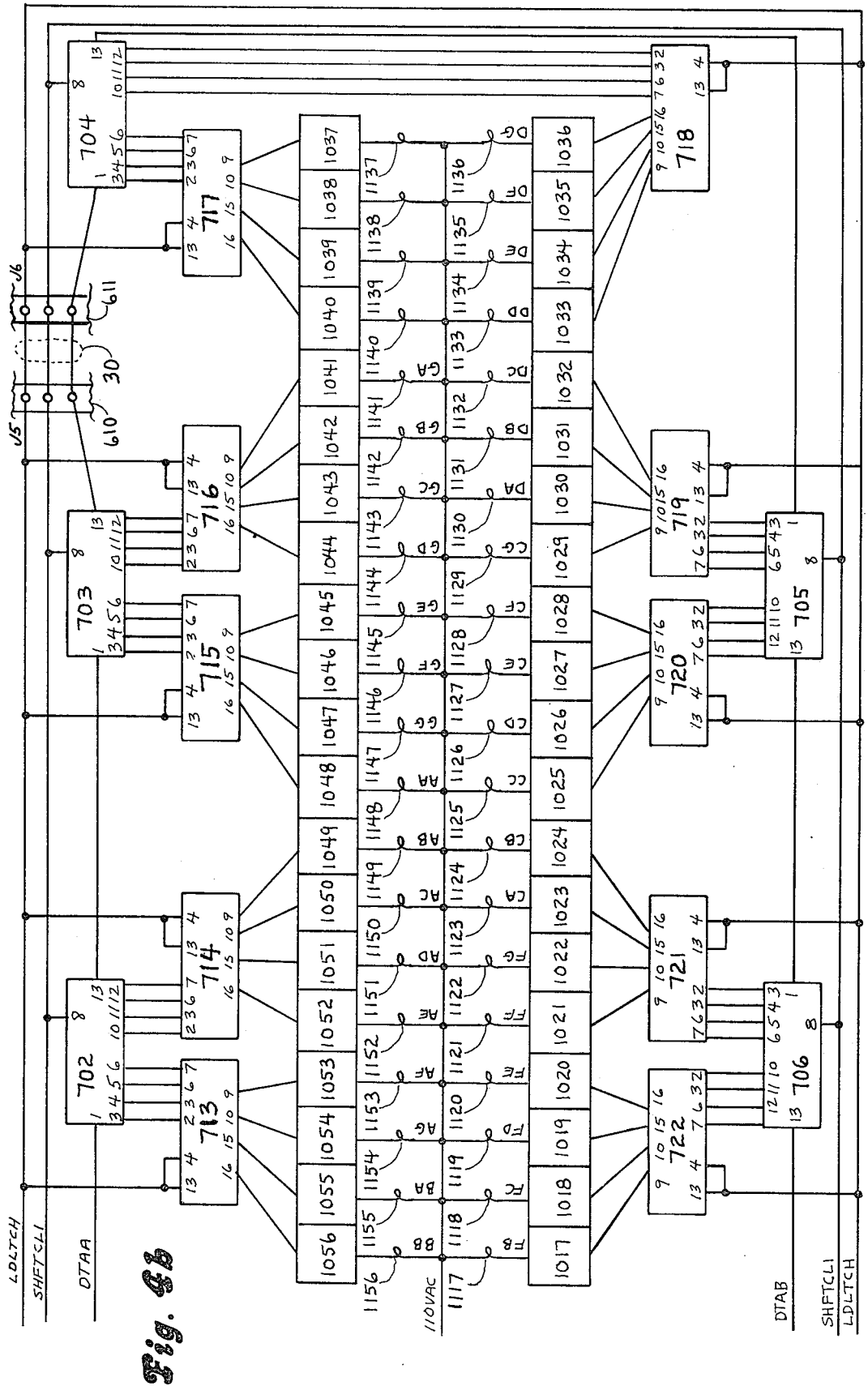

FIG. 6 is a block diagram showing the composite relationship of the circuits shown in FIGS. 3a, 3b, 3c and 3d of the control member of the instant device and the circuits of FIGS. 4a and 4b of the remote display member of the device.

Figure 2:
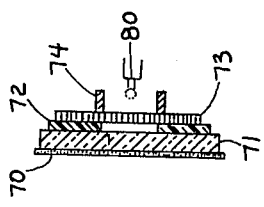
FIG. 2 is a side-partial sectional view of the face panel of the remote display member taken along line 2—2.
Figure 2A:
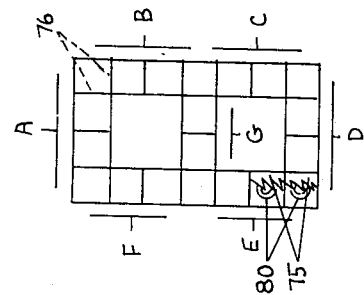
FIG. 2a is an enlarged front view, partially in section, illustrating one of the decimal number 7-segment displays of the device.
Figure 1:
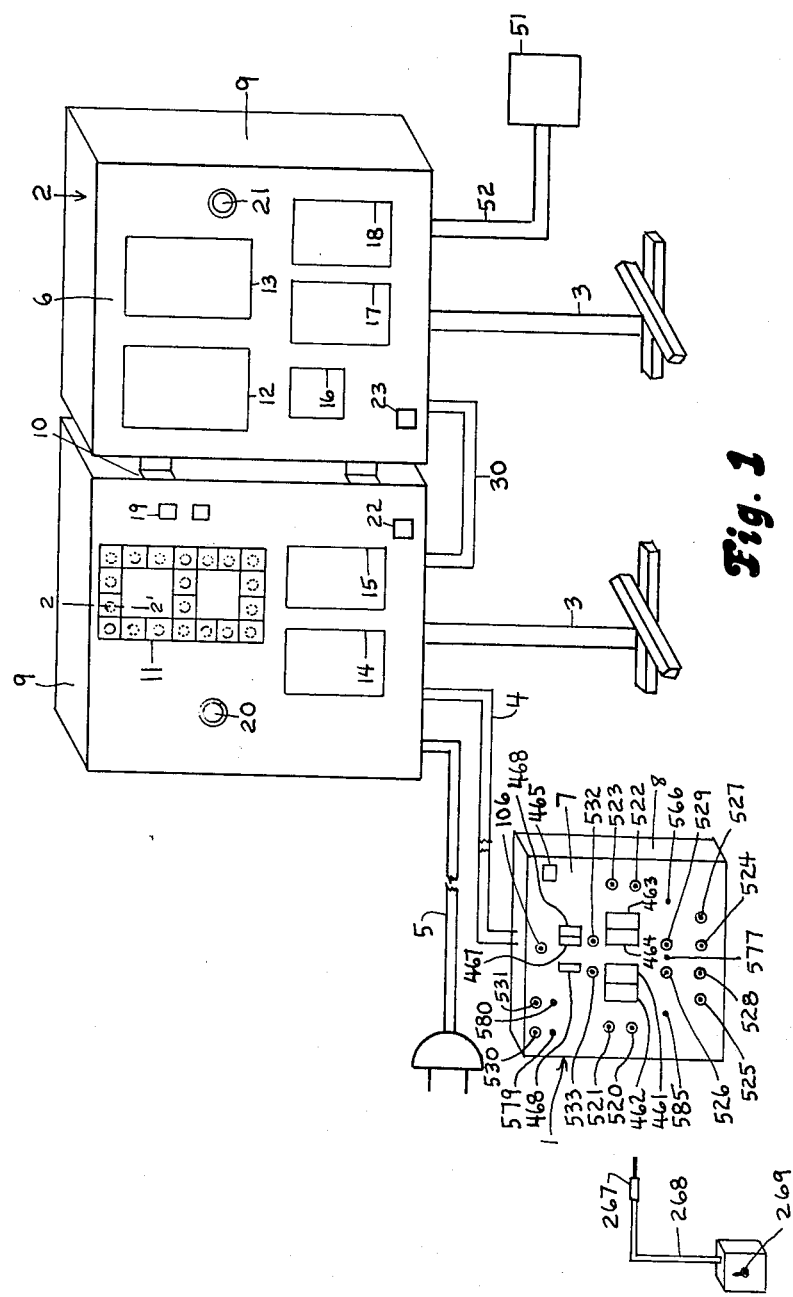
FIG. 1 is a schematic view of a specific embodiment of the display device of the present invention in the form of a basketball scoreboard and time clock wherein the remote display member is adapted and fitted into a collapsible, portable carrying case housing.

With particular reference to FIGS. 1, 2, and 2a, the basketball scoreboard embodiment of the display device of the invention shown, comprises a control member designated generally as 1 having a housing 8, and a face panel 7, upon the latter of which are mounted manual buttons and/or switches 520–533 and 106, whose functions are described hereinafter. Also provided on face panel 7 on control element 1 are illumination elements 579, 580, 585, 577, 566, which are each light emitting diodes (LEDs), and illuminatable 7-segment decimal number displays 461–465, the latter being each of the type and being mounted adjacent to panel face 7 as more fully shown in FIG. 2a and described hereinafter.

Separate from control member 1, a remote display member 2 is provided comprising two housings 9 which are connected and hinged at 10 to impart foldability and closeability to remote display member 2 into a portable closed case containing the elements thereof, as shown, remote display member 2 is adapted with support members 3, which in practice may be removable and collasped or folded for ease of carry. In the embodiment shown, remote display member 2 has a face 6 on which are visible 7-segment display members 11–16, all of which are of the type shown in FIG. 2a and described more fully hereinafter, and illumination elements 19–21. In the embodiment shown, the device, at remote display member 2, is connected by cable 5 to a power source (110v), and the two housing portions 9 of remote display member 2 are interconnected by cable 30, the latter illustrating a feature of the portable display device comprising a remote display member which may include a multiplicity of collapsible or non-collapsible sections which can be "daisy-chain" connected in a series to provide a total remote display of a size limited by the availability of a source of required power. Either remote display member 2 or control member 1 suitably may also be provided with audio-indicating means, controllable and actuatable, on signal, from the functions and/or logic in control member 1. In the basketball scoreboard embodiment shown, a horn 51 is connected to the system, in this case, a remote display member 2 by cable 52.

In the scoreboard embodiment shown 7-segment display member 11 is employed to display playing time in minutes, 7-segment member 12, to display time in tens of seconds, and 7-segment display member 13, to display time in seconds up to 9. Seven-segment displays 14 and 15 are employed to indicate the visitor's score, display element 14 in tens of points, and member 15 in points up to 9, respectively. Similarly, 7-segment display members 17 and 18 are employed to display the home team's score, respectively, The game quarter is displayed on remote display member 2 by array member 16.

Display elements 11 through 18 are adjacent to face panel 6 and visible thereon by means of the arrangement shown in FIG. 2. As shown in FIG. 2, face panel 6 is a sheet of 71 clear plexiglass. Affixed rearwardly of face sheet 17 are negatives 72 of each of the 7-segments of the 7-segment display. Adjacent to negative sheets 72 and rearward of face sheet 71 is a colored filter sheet 73 suitably composed of a translucent material such as colored paper, dyed cellulose and the like, colored white, red, green, etc. as desired. The respective segments of a 7-segment indication, i.e. the decimal number displays of elements 11–18, and 461–465, are each composed of a plurality of segment elements 75 divided, for viewing clarity and sharpness, by segment dividing lines 76, and each individual segment element 75 is provided with an illumination element 80 positioned rearwardly of face sheet 71 and adjacent to filter 73. For illumination element 80, shield elements 74 are provided, positioned between the individual illumination elements 80, to preclude individual segment elements 75 from becoming illuminated except when the respective element 80 therebehind is energized and illuminated. For the display of encoded 7-segment data bits as decimal numbers, the segment elements 75 are combined and grouped into segments coded A, B, C, D, E, F, and G as shown in FIG. 2a, allowing 7-segment data to produce any numeral display of 0 to 9 depending upon the respective binary values of the bits assigned to effect illumination of segments A–G. In the design shown 7-segment data bits are passed to the inputs of silicon-controlled rectifier lamp drivers, e.g. lamp driver 1001 in FIG. 4a, such that a pulse (bit=1) to the lamp driver is a "no-illuminate" signal to the negative segment, and, for example, a 7-segment data bit string ABCDEFG of 0000110 produce 7-segment illumination of element 11 in the form of the numeral 3. It will be noted that each corner segment element 75 of a 7-segment figure and the segment element between segments B and C are capable of becoming illuminated by 2 encoded data bits, such as, e.g. lower left-hand segment element 75 can be illuminated by a data bit coded either E or D.

The control member or head 1 for the unit shown is constructed in a housing 8 with dimensions of about 5 inches by 6 inches by 3 inches. As shown in composite FIG. 6, wherein the circuits shown in FIGS. 3a, 3b, 3c, 3d, 4a and 4b are represented diagrammatically and wherein all circuits of the FIG. 3 designation, ie. FIGS. 3a–3d, are located in control member 1 and wherein circuits of the FIG. 4 designation ie., FIGS. 4a and 4b, are located in remote element 2, control 1 contains all the electronics for the scoreboard, excepting only power supplies and the receiving and display circuitry that is in the remote member 2. In the scoreboard, shown remote member 2 also generated a 10 Hz signal which is sent to the control head 1. There is also a jack 519 for suitably connecting the data cable 4; switches or buttons (520–533, and 106) as required to control every scoreboard function; displays (461–468, 566, 577, 585, 579, 581) of every scoreboard function except the horn.

The face panel 7 is laid out so that the most often used controls are at the bottom, and the least used at the top. The scoring controls 520–523 are at the sides near the bottom, and the clock setting controls 532–533 are just above center, and may be colored red as a reminder that they are generally not touched except when setting the clock. The displays, whether numeric 461–468 or indicator, 566, 577, 579, 581, 585 are located close to the controls related to them. Furthermore, the controls preferably are labeled with colors that tend to associate them with their respective displays and with other related controls. For example, the clock controls 532–533 may be labeled with orange, the score controls 520–523, with yellow, automatics white, and miscellaneous, in green.

The control head 1 in the design described, in actuality, is rather filled inside, containing two hand wired boards, the displays, the switches and buttons, etc. There is over 100 feet of No. 30 wire used in its construction. In spite of the crowding, its layout is designed so that all pieces are easily accessible in case repair is needed. There are 70+ integrated circuits, and these circuits and the displays require less than 15 watts of power, the heat resulting being easily dissipated by few venting holes being provided. Feet (not shown) may be provided on the bottom of control element, for the purpose of keeping the venting holes clear, and also, conveniently keep the control head 1 from being slippery on a smooth table.

The control head 1 suitably may be constructed from a different chassis 7 & 8, very much like a calculator console, and measuring, for example, about 8 inches by 10 inches, with a maximum height of about 5 inches. This would allow room for additional logic and displays as required, for a local power supply (allowing use of a three-conductor data cable), and for special floor-facing displays on the rear of the control head.

The remote display 2, in the design shown, in actuality, is built into a piece of luggage 9, and together provide adequate room for a very respectable display. The space may be used in either a vertical format, with top and bottom halves, or with horizontal format, using right and left halves, as in the present system. The suitcase 9 of high quality, and provides a convenient means of portability to the system. Handles, fasteners, and a lock (not shown) may be provided. In the system as shown, remote member 2 houses the power supply 700 for the entire system, and a key switch 801 for turning it on and off is provided. The suitcase 9, in actuality, is modified for its use by painting the interior black, cutting suitable ventilation holes, and installing a ventilation fan in each half (not shown). A superstructure to support the components of the electronics (not shown) is built in.

Besides the bulbs 80 of the display, illumination elements, e.g. element 11 organized as numbers or other arrangements at need, the components mounted in the scoreboard shown include the data circuit, including elements 486, 221–223, 491–493, 301, 302, a 10 Hz transmitter circuit, including elements 494–495–496, a number of individual cards holding the receiving registers 701–708, data latches circuit, including elements 711–726, and lamp driver circuitry including elements similar 1001–1064 and the power distribution arrangements, comprised generally of solder and lug terminal strips (not shown).

In actuality, in the embodiment of the device shown, the face 6 of the scoreboard is of a Plexiglass sheet 71, and the layout is done photographically. Individual negatives 72 for the 7-segment displays 11–15, 17, 18, the quarter array 16 the bonus lights 20, 21, the colon 19, and the Qr abbreviation were made, and fastened in the appropriate locations with epoxy paint. A piece of ordinary bond paper 73 was affixed behind each mask with the same paint to provide the translucence which provides the uniformity of light. In the case of the quarter array and the Qr abbreviation, a green filter part of 73 was also affixed, since smaller green bulbs are not economical nor are they very bright, so white bulbs are used there. Shades 74, somewhat akin to egg cartons, were installed on the back of the face behind the masks, so that each bulb 80 will be prevented from lighting adjacent areas. This helps give the display its sharpness. Any remaining area of the display 6 not blacked out by negatives was painted black to keep light leaks out, and to provide the great contrast that makes the display 6 so visible. The entire face is then covered by a piece of black screen 70 (nylon screen painted with flat black enamel). This is glued on with epoxy paint by putting down a layer of the paint on the face 6 of the Plexiglass 71 then lightly stretching the screen across the surface and holding it there while the paint hardens. If any paint were to get on the front of the screen, it would become glossy, partially eliminating success of the screen's function, which is to reduce glare. This is so successful that the display 6 can be seen to very lo incidence angles, i.e., less than 15°.

Though photography would continue to be the means by which the face 6 is done, individual negatives 72 may be replaced by a coating of special paint-on emulsion, face 6 then itself becoming a negative. This increases the accuracy of a display positioning, but more importantly, allows versatility for layout of the indicia display pattern limited only by interior component mounting scheme, and allows virtually any or every position of the face to be used as a bulb location, making customized displays as easy as standards. Additional features for the display face are anticipated, such as a provision for showing the color uniform a team is wearing via 22 and 23, their name, player number and personal foul counter etc.

The cabling ports (not shown) may be in the bottom of the display 2 on the edge of the suitcase 9. When the suitcase 9 is closed up, these may be covered by magnetically held plates that blend with the original appearance of the suitcase. The plugs 610, 611, 802, 803 labeled (with the exception of the power plugs), and the cables 4, 5, 30, 52 may be, and preferably are designed to go only in one way, to eliminate possibility of connection error. In practice, connecting the required cabling is very simple, particularly since every cable has an easily understandable function. It takes only one person about ten minutes to set up the scoreboard, shown, from start to finish.

In the embodiment shown, remote member 2 is fused for 3 amperes, but draws somewhat less that that. The total power used is less than 300 watts, at least in the configuration shown. Of course, additional logic and additional bulbs which can be added as desired would increase the power consumption, but displays in most instances would not reach such proportions that any convenient wall outlet of 110 v. would not support its operation.

Most of the bulbs 80 in the display embodiment shown, in actuality, are standard Christmas tree bulbs or 12-volt flash light bulbs, chosen respectively because of their accessibility, coloring, long life, and resolution.

In the system, shown, in actuality, the data cable 4 is 25 feet long, and power is supplied through this to the control head 1 as well as the data being transmitted. Two amperes at five volts are used by the control head 1, as shown, and precludes the use of a longer cable directly -- the voltage drop in the cable leaves too little voltage for the control 1 to run on. A 110 foot addition may be added and used with the system. That allows the control head 1 to be used up to 135 feet from the suitcase 2, but a separate power supply for the control head 1 is then needed.

The control head 1 suitably may contain its own power supply and timing source, so that interconnecting cable 4 can be reduced to its minimum (two to four wires, depending on the complexity of the receiver circuits), or suitably may be replaced with an FM radio data link. The horn 5 may be located at the control head 1, rather than with the remote member 2. Besides reducing or eliminating the cable 4, this approach would allow other means of supporting the scoreboard 2 for example, by hanging from available overhead supports.

The control head 1 has a small jack 534 for attachment of a separate clock control switch 269. This switch 269 is mounted in a small (1 inch by 1½ inches by ¾ inch box at the end of a 6 foot cable 268. When plugged in, this switch removes control of the clock from the run-stop switch 525 on the control head 1, and assumes control itself. The purpose of this is to allow a single person, a timekeeper, exclusive control of the time clock circuits, without giving him the additional worries that posting score, etc., require.

The basic time clock controls are a run-stop switch 525 in the lower left corner of the face panel 7, and two buttons 532 and 533 near the center of the face panel 7 which are used to set the clock 401–405. There are additional controls which relate to the clock 401–405, but these will be described hereinafter.

When the clock run-stop switch 525 is moved from the stop to the run position, the clock (401–405, displayed in 466–468 & 11–13) will start to run and continue to run until one of the three following events: the switch 525 is returned to the stop position; the clock 401–405 itself reaches zero; or the timeout button 526 is pushed. In the last two cases, the clock 401–405 will be stopped even though the run-stop switch 525 is in the run position. The clock 401–405 will not start again until the switch 525 cycled off-on. The clock 401–405 may be run from zero (cycling in one second to 9:59) by using this procedure.

While the clock 401–405 is running, an LED indicator 585 near the run-stop switch 525 will blink at a 10H$_z$ rate, and the clock colon 19 on the remote display 2 will be red, the same color as the clock numerals 11–13. When the clock 401–405 stops (regardless of the position of the run-stop switch) the LED 585 will go dark, and the clock colon 19 will turn to yellow. This provides a visual signal to both the operator and the audience about the state of the clock 401–405.

Figure 3A:
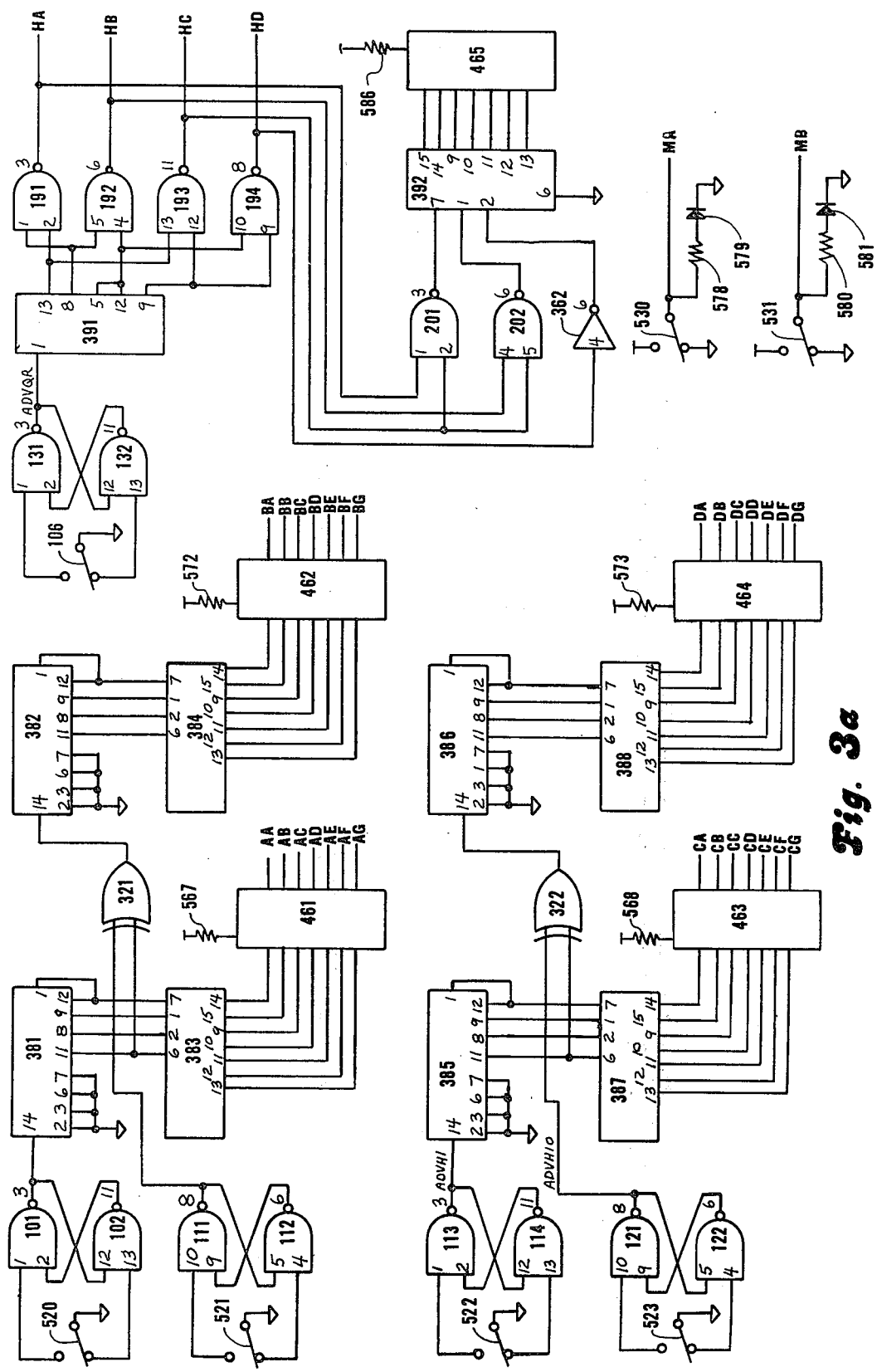
FIGS. 3a, 3b, 3c and 3d are of the control member circuits.
Figure 3B:
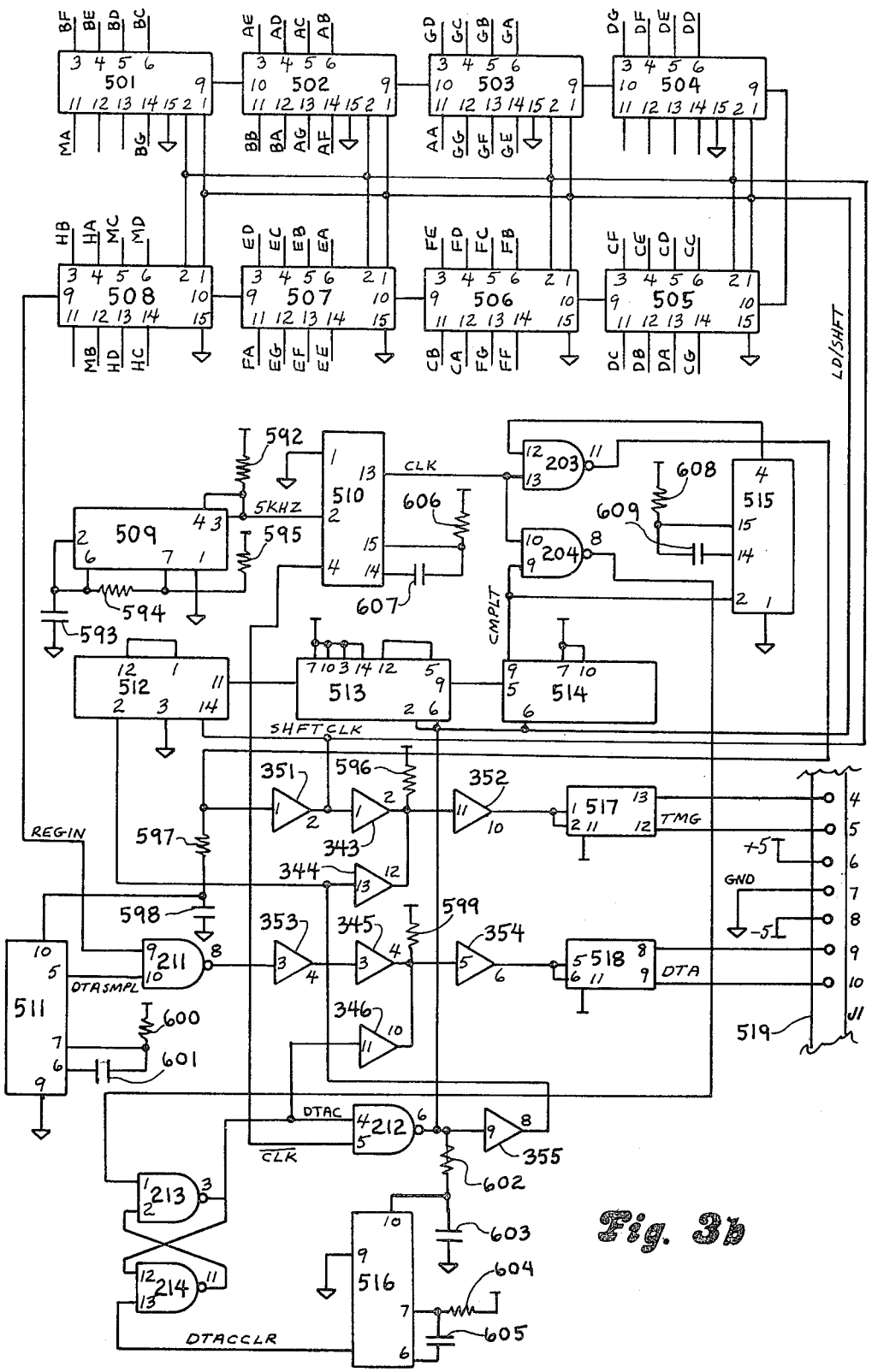
Figure 3C:
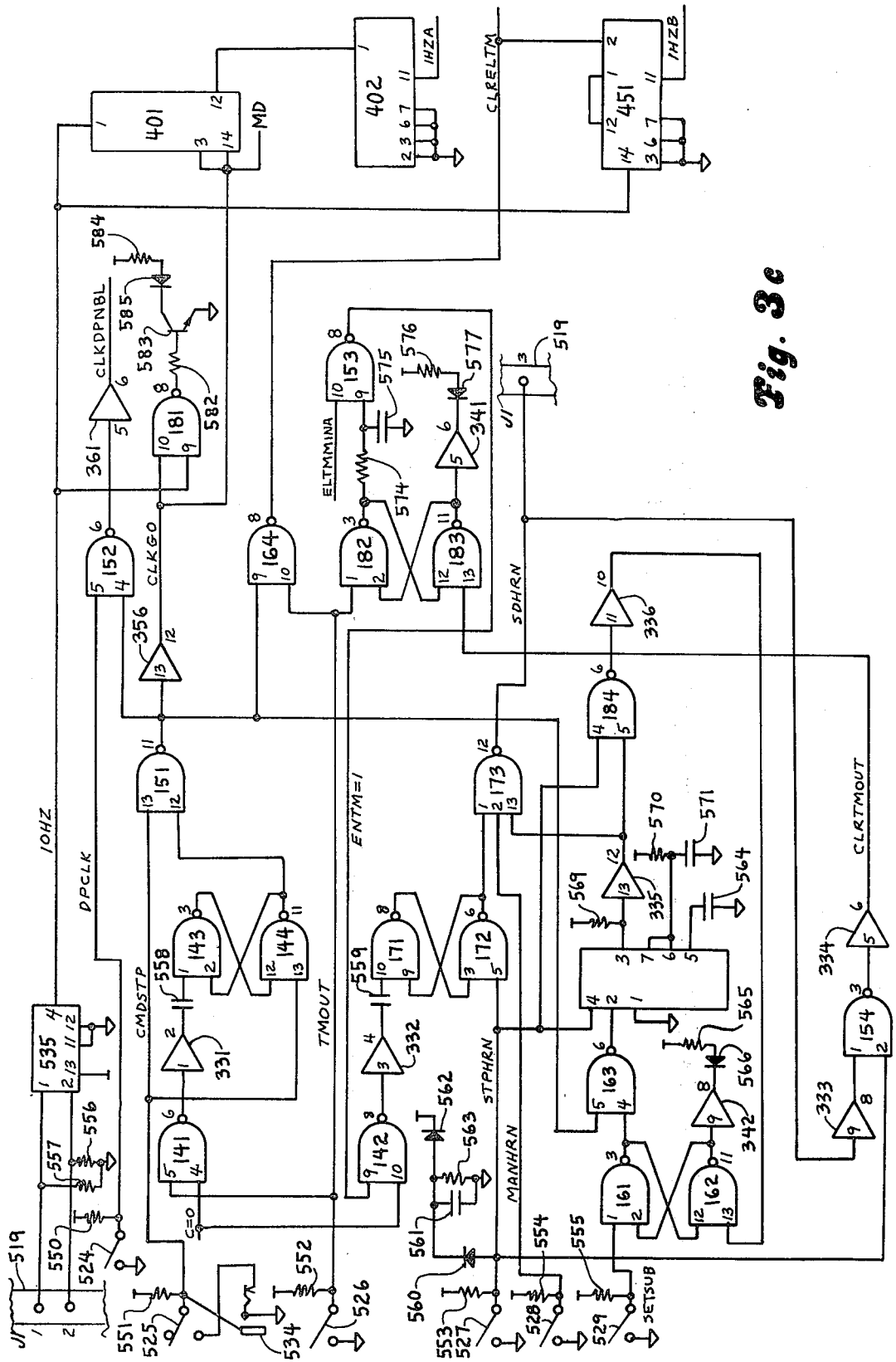
Figure 3D:
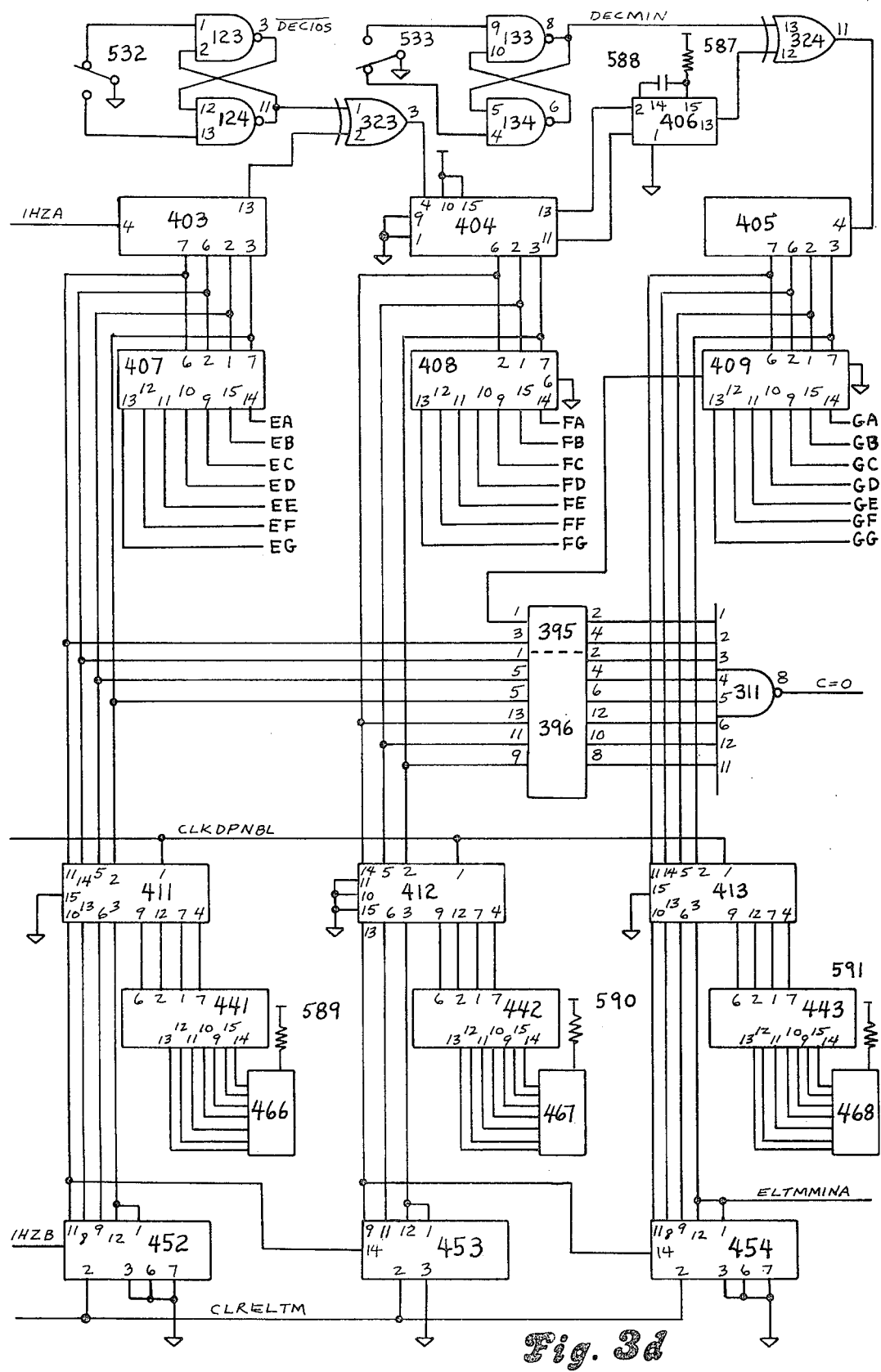

The clock circuitry 401–405 in the embodiment shown FIGS. 3c and 3d, measures to the fifths of seconds, and so when the clock is stopped with the time start-stop switch 525 or the timeout switch 526, it may be in the middle of a second. While this is normal in the course of a game, it does place a restriction on setting the clock. It is not appropriate to run the clock until the last digit (seconds) is zero, then use the buttons to set the clock to the desired period length. This might result in the first second of the period being short by some tenths of seconds. The correct way is to let the clock run to zero, thus stopping itself at precisely the right moment, then using the buttons to set the clock. Of course, the buttons may be used to move the clock more quickly toward zero, but the clock should be allowed to stop itself. Then the first second of the period will be a full second, and not a fraction of one.

The leftmost 533 of the two buttons 532–533 will cause the clock time 401–405 to decrease by one minute each time it is pushed. A decrease from zero minutes will yield a nine. The rightmost 532 of the two buttons 532–533 will cause the tens of seconds digit to decrease by one. A decrease from zero will yield a five, and the minutes digit will decrease by one. These two buttons 532–533 may be colored, e.g. red, as a reminder to the operator that they are not used except for setting the clock.

The clock is normally displayed in the displays 466–468 in the center of the control head 1, though there is an exception to this when the clock is stopped, as described hereinafter.

Two score displays, one for Visitors 461–462 (on the left) and one for Home 463–464 (on the right) are provided on control head 1. Four buttons 520–523 control these scores, two associated with each being located near the sides of the control head 1 near the score they control. The lower button 520, 522 of each pair counts the units digit in the respective score, by 1 each time the button is pressed. A count from 9 to 0 will cause the tens digit to increase by 1. The upper button 521, 523 of each pair will cause the tens digit to increase by 1 each time it is pressed, increasing the score by 10.

The scores are returned to zero for the beginning of a game or match by counting the units digit to zero, then counting the tens digit to zero. In the design shown, the tens digit at zero is not displayed.

A quarter counter 391 is provided and is controlled by a button 106 in the upper right corner of the face panel 7, next to the quarter display digit 465. In the design shown, the quarter advances by 1 each time the button is pressed, cycling from 4 to 1, 1 to 2, etc.

On remote display 2, the quarter number is repeated in a small array 16 on the right housing side 9. The number is prefixed by a mask on the left showing "Qr."

The bonus light displays 20 and 21 on remote display 2 are controlled by two switches 530–531 in the upper left corner of the face panel 7. When the switch 530 or 531 is placed in the upward position, the LED 579 or 581 by it will light, and the bonus light 20 or 21 on the remote display will light. The bonus lights are for basketball in particular, but are characteristic of the sort of condition indications that may be displayed. Other examples might be possession (football), time advantage (wrestling), etc.

The miscellaneous control switches and buttons on panel 7 that have not been fully described above are a "sound horn" button 528, a "timeout setup" button 526, a "substitution setup" button 529, a "display game clock" switch 524, and a "stop horn, cancel timeout or substitution" button 527.

"Substitution setup" button 529 is intended for basketball. This is pressed when a player reports to substitute. A LED 566 by the button will light to indicate that a substitute is waiting. When clock 401–405 is next stopped, the horn 51 will sound automatically for about three seconds. This feature keeps the operator from forgetting that he should sound the horn 51 so the substitute can enter the game. If the substitute changes his mind, the condition may be cancelled with the "stop horn, etc." button 527. If clock 401–405 is already stopped when substitute button 529 is pressed, horn 51 will go off immediately for three seconds.

"Display game clock" switch 524, when it is in its upward position, causes game clock 401–405 (the one that is running downward toward zero) to be displayed in 466–468 all the time, even when stopped. As previously mentioned, there is a second clock circuit, containing elements 451–454 in the scoreboard system that keeps track of how long it has been since clock 401–405 was last stopped. It is clock 451–454 that signals horn 51 for the one minute timeout. When game clock 401–405 is stopped, timeout clock 451–454 will be displayed instead if "display game clock" switch 524 is in its lower position.

"Stop horn, cancel timeout or substitution" button 527 performs any or all of those listed functions, but they do not ordinarily occur at the same time. Horn 51 sound under three conditions, not including manual control by sound horn button 528: When clock 401–405 runs to zero; when a timeout ends; and when clock 401–405 is stopped while a substitution is set up. Only in the last case does horn 51 stop automatically. In the other two cases horn 51 must be stopped, after a suitable time determined by the scorekeeper, by pressing stop horn button 527.

Timeouts often end before the mandatory time is up, so stop horn, etc., button 527 may be used to cancel the timout condition. Otherwise, if a subsequent stopped-clock period lasts one minute, horn 51 will sound. Any sounding of horn 51 will cancel the timeout condition, so that is an alternate way to reset it.

Substitutions are rarely cancelled, but that capability is provided on the scoreboard shown. The substitution condition resets automatically when clocl 401–405 is stopped, by sounding horn 51 and filling its purpose.

In the design shown, these miscellaneous functions were built into the system to make it particularly amenable to basketball under the conditions that it was being operated by not-too-experienced persons, to make their job easier, and eliminate extra equipment (such as a timeout stopwatch) at the scoring table. Subsequent systems may include these, modifications of these, or entirely different features designed for a particular sport. For example, the horn might be caused to sound when a team received its fifth foul, as a signal to the officials that the other team was now in a bonus condition; or, in baseball, the scoreboard 1 and 2 might automatically provide a reveiw of game scoring on the remote display 2 at the end of each inning.

On FIGS. 3a, 3b, 3c, 3d, 4a, and 4b names such as CMDSTP are given to various siganl conductors. These are mnemonic names indicating what function that signal has. CMDSTP stands for "command stop", SETSUB for "set up substitution"; etc.

With further reference to FIG. 3a, 3b, 3c and 3d as shown, all of the buttons that control counters, for example, button 520, have their single pole grounded, and the two throw connections go to set/reset flip-flops, for example 101–102 as shown in FIG. 3a so that they are "de-bounced" providing a single pulse to a counter, e.g. decade counter 381 each time one of the buttons 520–523 is pressed.

On all the switches, and on those buttons that merely indicate or set conditions, for example 524 the single pole is connected to logic, for example, 152 pin 5, one of the throw connections is grounded, the other connected to Vc (+5 volts) or left floating. Pressing such a button, or actuating a switch, connects or disconnects the ground from the logic inputs, as shown. Since these inputs are merely combinational, there is no need to de-bounce.

Every LED 566, 577, 579, 581, 585 on the panel as shown, operates with its cathode grounded, so that the anode must be brought high (with suitable current limiting) in order that it turn on. The two bonus light LED's 579 and 581 are turned on the the $V_c$ supply. The remaining LED 566, 577, 585 are controlled by the logic of control head 1.

The present design is provided with set/reset flip-flops which de-bounce the signals from the described counter-controlling buttons on the panel. Additional debouncing flip-flops can be seen in the quarter-counting and clock setting circuiting on the diagram. The 7 debouncing flip-flops are 101–102, 111–112, 113–114, 121–122, 131–132, all in FIG. 3a, and, 123–124, and 133–134 in FIG. 3b.

The flip-flops are constructed of two nand gates, cross-coupled, as can be seen on the diagram. A nand gate functions such that if either input is brought to a low voltage, the output will go to a high voltage. Unconnected inputs "float" high. Consider then the debouncing flip-flop comprised of the two nand gates 131–132 with the output ADVQR (advance quarter) from pin 3. Pin 13 is normally gounded by the button 106, while pin 1 is unconnected and floats high. Hence pin 11 is high, and since both inputs to the upper gate are high, pin 3 is low. When button 106 is pushed, the gounding contact will leave the normally closed contact of the switch, connected to pin 13. Pin 13 will float high, however, pin 3 is still low, so pin 11 is held high, and there is no tendency for pin 3 to go high. Eventually, the switch crosses the distance to the side connected to pin 1, pulling it low. In fact, the switch will bounce a little and pin 1 will make several high-to-low-to-high excursions. The very first time that pin 1 goes low, though, pin 3 will be forced high, and since both inputs to the lower gate 132 are then high, its output will be low, which fed back to the upper gate 131 will hold pin 3 in the high state, regardless of switch bounce on pin 1. It will remain in this high state until the button is released, allowing the grounding contact to come back across the distance and bring pin 13 low again, when the flip-flop 131–132 will resume its original state. Thus regardless of bounce, the flip-flop sends only one pulse to the counter, e.g. decade counter 391. Otherwise, the counters are fast enough to count on every bounce, and the score would go up rather quickly (5 to 10 per button press). As a memory element, the flip-flop will remember which of its two inputs was the last to be at a low voltage. This "principle" is used for most functions in the control circuitry, with one major exception.

The exception is element 535 (FIG. 3c), a differential dual line receiver that receives 10 $H_z$ signal coming from remote member 2, and converts the signal to TTL levels for control head 1. The data, in the present case, is sent by differential means. This helps eliminate interference and allows extremely long control lines. With the differential units used, cable 4 could be about 2000 feet long with no problem. Two 82 ohm resistors 556 and 557 terminate the line properly and prevent reflections.

Referring to the control logic of the design shown, a CMDSTP signal from button 525 comes to pin 13 nand gate 144 (also to pin 13 of nand gate 151). Assuming that the flip-flop 143–144 is set so that pin 11 of nand gate 144 is high, then, when CMDSTP is high, pin 11 of nand gate 151 will be low, and when CMDSTP signal is low, said pin 11 will be high. This signal is called $\overline{CLKGO}$, and is inverted by an inverter 356 to become a signal called CLKGO which goes to a dual J-K flip-flop 401 where it allows the clock to run when it is high.

The CLKGO signal is brought to a nand gate 181 with the 10 $H_z$ signal. When the clock is stopped, CLKGO must be low, and so pin 8 of 181 must be high, the output of the subsequent inverter element shown 181 must be low, thereby holding the LED 585 off. When the clock is running, CLKGO must be high, and so the output of 181 pin 8 will oscillate at a 10$H_z$ rate, causing the LED 585 to blink.

A flip-flop labelled CLKSTP 143–144 (clock stop) is provided as shown (FIG. 3c). Flip-flop 143 is connected to a nand gate 141 with the input signals C=0 (clock equal zero) from a nand gate 311, and TMOUT (setup timeout.) These two inputs are both normally high, so that nand gate 141, pin 6 is low, and pin 2 of an inverter 331 which receives its output is high. If an input of nand gate 141 goes low, inverter 331 pin 2 will go low. This will momentarily pull nand gate 143 pin 1 low (through a capacitor 558), causing the flip-flop 143–144 to go into the state with pin 3 high and pin 11 low. If said pin 11 is low, then nand gate 151 pin 11 must go high, CLKGPO will be low, and clock 401–405 will stop running. The clock will not run again until flip-flop 143–144 is reset. This is accomplished by turning clock switch 525 to the stop position. This brings nand gate 144 pin 13 low, resetting flip-flop 143—144, so that when clock switch 525 is returned to the run position, both pins 12 and 13 will be high, allowing the clock to run.

The variable signal SDHRN (stop horn) at nand gate 173 pin 12 runs horn 51. When it is high, horn 51 will sound. Nand gate 173 is a 3-input nand, working so that when any input goes low, the output goes high, sounding horn 51. There are three ways to sound horn 51. Nand 173 pin 2 comes directly from soundhorn button 528 on panel 7, pushing button 528 pulls that input low and horn 51 will sound. Nand 173 pin 1 comes from a flip-flop 171–172. Flip-flop 171–172 is reset with the signal STPHRN, (stop horn) the normally high signal from the button 527 on the panel labelled "stop horn, etc". Pushing button 527 will guarantee that triple-input nand 173 pin 1 is high. Backwards from nand 171 pin 11, two inputs exist that will cause horn 51 to sound, just as the two inputs previously discussed caused the clock 401–405 to stop. These two inputs are C = 0 signal and a ENTM = 1 signal (end timeout) so horn 51 sounds when clock 401–405 reaches zero, and when a timeout is supposed to end, discussed hereinafter.

The last input nand 173 pin 13, comes from a timer 436, a 555 timer used as a three-second one-shot, and it goes low for three seconds when the clock is stopped while a substitution is set up, discussed below. Stop horn button 527 resets SDHRN flip-flop 171–172 stopping the horn.

A variable signal called CLRELTM (clear elasped time), from a nand gate 164, pin 8, serves to reset timeout clock 451–454 (FIGS. 3c and 3d) to zero. This happens whenever said pin 8 is high. Nand 164 pin 9 goes low while the clock 401–405 is running, holding timeout clock 451–454 at zero, nand 164 pin 10 goes low whenever timeout setup button 526 (FIG. 3c) is pushed, thereby resetting the timeout clock 451–454 to zero. This way the clock 451–454 starts from zero whenever game clock 401–405 is stopped, or at the start of a timeout.

Pressing timeout button 526 also stops clock 401–405, as already discussed, and furthermore sets a timeout flip-flop, of nands 182 and 183. This makes nand 182 pin 3 high, which goes to a nand 153 pin 9, through a filter element 574–575 which keeps spurious glitches from firing the horn. ELTMINA (elasped time, timeout, minutes, bit a) goes high as soon as the timeout clock reaches one minute, causing nand 153 pin 8 to go low, firing 51 horn through nand 142 pin 9 as previously mentioned. As soon as horn 51 sounds, the high SDHRN signal is applied to inverter 333 pin 9, which (since STPHRN is high) comes out as a low at inverter 334 pin 6, which applied to nand 183 pin 13 as CLRTMOUT (clear timeout) causes timeout flip-flop 182–183 to reset. Similarly, a reset occurs when STPHRN goes low. Timeout LED 577 is driven from nand 183 pin 11 and a similar function has already been described.

Pushing set-up-substitution button 529 momentarily causes a flip-flop comprised of nands 161 and 162 to be set, and nand 161 pin 3 goes high, also nand 163 pin 4 which is connected to it. Now, CLKGO (the signal at nand 163 pin 5) is low while clock 401–405 is running, so nand 163 pin 6 continues high even though the SET-SUB (set up substitution) flip-flop 161-162 has been set. But as soon as clock 401–405 is stoped CLKGO goes high, and nand 163 pin 6 goes low. This transition fires timer 436, a 555 timer, used as a three-second one-shot. This means that 436 pin 3, the output of the timer, goes high for three seconds following the high to low transition on its input. This means that, for the time, inverter 335 pin 12 is low, bringing nand 173 pin 13 low and sounding horn 51. This signal is also applied to nand 184 pin 5, and since STPHRN is high, the output of inverter 336 pin 1 is low, and the SETSUB flip-flop 161–162 is reset through nand 162 pin 13. STPHRN is connected to timer 436 pin 4, which when brought low will immediately terminate the output of timer 436, stopping horn 51. This same condition STPHRN low, applied before horn 51 sounds, will function through nand 184 pin 4 to reset the SETSUB flip-flop 161–162 removing the substitution setup before horn 51 sounds. The substitution Led 566 is driven from nand 162 pin 11 in a manner already described.

The variable CLREL T,M, heretofore described comes to the "set to zero" inputs of 7490 decade counters 451–454. These four circuits make up the elasped time (or timeout) clock, and are forced to zero as described before. When allowed to run, counter 451 (FIG. 3c) divides a 10Hz signal input to 1Hz, providing one second pulses, signals 1HZB, to toggle the seconds counter 452 (FIG. 3d). 452 is a decade (divide by ten) counter, with four outputs. These four outputs assume in succession values which represent the digits 0 through 9 coded as BCD digits. For example, for 0 all the outputs are low. For other digits, one or more outputs will be high. The output counter 452 from pin 12 is called the least significant bit, and is assigned a "weight" of one. Counter 452 Pin 9 has weight two, pin 8 has weight four, and pin 11, the most significant bit, has weight eight. To represent the digits other than zero, a combination of outputs will come high, such that the sum of the weights of the active outputs is the digit desired. For example, to represent the digit 5, the outputs with weight 4 and weight 1 will be high. This approach corresponds exactly to counting in base two arithmetic, where five is represented by the number 0101. In fact, BCD means "binary-coded decimal." The last number is nine represented by 1001, which goes to 0000 at the next second. The most significant bit thus undergoes a high-to-low transition once every ten seconds. This variable is sent directly to the input of counter 453, but since there are only 60 seconds in a minute, it needs only to represent the digits 0 through 5. Thus, only the three least significant bits of a divide-by-twelve counter are used, and this provides the required function, moving from 101 to 000. The weight four bit is used to toggle the next counter, 453, another divide-by-ten counter that keeps track of minutes. The most significant bit from counter 453 is sent to horn control nand 153 (FIG. 3c) as ELT MINA, which we have already showed sounds horn 51 at the end of one minute during a timeout.

As for game clock 401–405, its control is by a 7473 dual J–K flip-flop 401. Pins 14 and 3 thereof are the J and K inputs, which determine what the output will do with every fall of the clock signal, in this case 10 Hz, applied to pin 1. If those two inputs, 401 pins 3 and 14 are high, then 401 pin 12 will undergo a transition (either to high, if low; or to low, if high) everytime the input at pin 1 thereof undergoes a transition from high to low commonly called 'at the fall of the clock'. Thus element 401 becomes a divide-by-two device, outputting a 5 Hz signal from its pin 12. If, however, element 401 pins 14 and 3 are held low, then the output is inhibited from undergoing any further transitions. This stops the clock.

When the 5 Hz signal is enabled so that the clock can run, it is applied to the input of a 7490 decade counter, 402 which further divides it by five, so that a 1 Hz signal, signal 1HZA, is available to toggle a seconds counter, a 74192 synchronous 4-bit up/down counter 403 (FIG. 3d). Counter 403 is very similar to counter 452, except that it can be made to count backwards as well as forward. Since a down-counting game clock is desired, counter 403 is connected for the backward operation. Counter 403 pin 4 is the down clock trigger, and its pin 13 is called the borrow output, which has a pulse on it as the counter cycles from zero to nine (0000 to 1001). Pins 7, 6, 2, and 3 thereof are the weighted outputs, and represent the digits 0 through 9 as described before.

The described borrow signal goes through exclusive-or gate 323 to the seconds counter 404, which causes 404 to count appropriately. Manual setting of the seconds counter, a 74192 binary synchronous up-down counter, is accomplished by routing the borrow signal through an exclusive - or gate 323 with the other input being from flip-flop 123–124 that de-bounces the "Decrease 10's of seconds" switch 532. Exclusive-or gate 323 has the function that if only one of the inputs is high, the output is high. If both inputs are high or low together, the output is low. What this means in this case is that neither input can prevent a transition in the other input from being propagated to the output. Thus, the borrow signal can get through to toggle counter 404, and the manual control can get through to toggle counter 404, and neither one can interfere with the other. A good name for this is "mixing" of the two signals, though the word has different meaning in other electrical engineering applications.

404, the tens of seconds counter, is the same sort of device that counter 403 is, counting down one digit with each pulse at the count-down input. But like counter 453, it must never show numbers in excess of 5. This is accomplished by using some additional features of the device that were not necessary with counter 403. The word that is desired after 0000, in this case 0101, is set up by wiring pins 1, 9, 10, and 15 or counter 404 to Vc or ground appropriately. This word will be "forced" or better, "loaded" into the counter whenever 404 pin 11 is brought low. So what is needed is to bring said pin 11 low every time counter 404 counts from 0000 to 1001. The 1001 will persist for only a moment, being overwritten with 0101 by the signal at pin 11. In this case, the load signal is generated by a one-shot 406 74123 (dual retriggerable monostable multivibrator with clear) element which fires when the borrow output of counter 404 pin 13 occurs. The one-shot element 406 has two outputs, one which is low until the one-shot element 406 is triggered, when it outputs a brief high pulse; and the other which is high until the one-shot element 406 is triggered, when it outputs a brief low pulse. The low pulse from pin 4 of 406 is fed forward to toggle a minutes counter 405, which is an element similar to counters 403 and 404. Again, the toggling signal is mixed in an exclusive-or gate 324 with the manual signal from de-bouncing flipflops 133–134, so that either may count down minutes counter 405.

Remote member 2 is to always show game clock 401–405, so seven-segment information is generated directly from the outputs of counter 403, 404, and 404 by (7447) BCD-to-seven-segment decoders 407, 408 and 409, respectively, to which they are connected, and whose outputs go directly to illumination elements in displays 468, 467, and 469, respectively, similar to those described in FIG. 2. These devices provide the correct coding to show the BCD digit as a readable number in a visual display. This seven-segment data is latched in 74165 (parallel-load 8-bit shift register) latch elements 501–508 (FIG. 3b), as shown for transmission to remote member 2.

The display by the latches 501–508 on the control head 2 is to be the game clock 401–405 much of the time, but may show timeout clock 451–454 depending on whether the game clock is stopped and on the setting of the "display game clock" switch 524. This capability is provided by three multiplexor (74157) devices 411, 412, 413, connected as shown (FIG. 3d). Depending on the state of CLKDPNBL (clock display enable), multiplexor 411, for example, will route to its outputs (pins 9, 12, 7, and 4) either the BCD word from 403 or the BCD word from counter 452. Similarly, for multiplexors 412 and 413. The outputs of multiplexors 411, 412, and 413 are sent to BCD-to-seven-segment encoders 441, 442 and 443 from which the necessary seven-segment data for energizing illuminating elements in displays 466, 467, and 468, respectively.

The score counter for each team is a pair of decade counters 381–382, 385–386 (FIG. 3a). The de-bounced count signal from flip-flops 101–102 or 113–114 to count units comes to pin 14 of counter 385 for example, causing it to count once. It cycles in BCD as already described and the transition of the most significant bit from 1 to 0 toggles counter 386, the tens counter. Again, the toggling signal is mixed with the de-bounced manual signal from flip-flops 111–112 in an exclusive-or gate 322, so that tens may be counted manually from control panel. Outputs are sent to BCD-to-seven-segment decoder 387 and 388 to provide seven-segment display information, both for local displays 463 and 464 respectively and for transmission to remote member 2. The other score counter, comprised of similar elements 381, 382, 383, and 384 respectively functions identically to provide seven-segment display information in display 461 and 462, and for transmission to remote 2.

The quarter counter circuit is implemented with a pair of (7493) J-K flip-flops both located in one package 391. The J-K inputs are allowed to remain unconnected, thus floating high and allowing the outputs to toggle with every fall in the input. With this arrangement, the cycle of outputs is 00, 01, 10, 11, 00, etc. The flip-flop outputs are fed into what is commonly called a one-of-four decoder, made with nand gates 191–194. As it is connected, only one of the four nand gates can have a low output, the others are high. These four outputs are latched for transmission to remote member 2 by (74165) a parallel-load 8-bit shift register 508 (FIG. 3b), since that number is not seven-segment format. They are also fed to nand gates 201 and 202 (FIG. 3a) and an inverter 362 pins 4 and 6 (really a nand gate with only one input used). These three devices generate a BCD coding of the four states, so that a 001 is applied to a seven-segment encoder 392 when the state of flip-flop package 391 is 00; a 010 when the state is 01; a 011 when the state is 10; and a 100 when the state is 11. This allows the decoder 392 to generate correct seven-segment data for local display of the quarter counter in display member 465.

The transmitter feed circuits of the device shown (FIG. 3b) includes eight (74165) 8 bit, parallel-load shift registeres 501–508 connected as shown. All the data that is to be sent to remote member 2 is brought to their inputs. The LD/SHFT (load/shift) line is pulsed at the appropriate time to load the data into the respective registers, then there are 64 pulses on the SHFTCLK (shift clock) line which moves the data through registers 501–508 one position at a time, making available to the transmitter from 508 pin 9 a serial 64-bit string of data. As shown the signal CLKGO input (signal MD, FIG. 3c) at pin 6 of 508 will appear at pin 9 as soon as the load is completed. After one pulse of SHFTCLK, SDHRN (signal MC, FIG. 3c) will appear at pin 9, then HA, etc., until all the data has been shifted through. The data is assigned input positions in such a way that the appropriate data will be available on that side of remote member 2 where it is needed for display. Only 58 of the available 64 positions are needed for the display member shown, some of the remaining are not used, some are used for test purposes.

This register string can be expanded, with only one minor change in the transmitter to any number of devices, allowing transmission of more display data to the remote member 2.

The transmitter circuits of the embodiment shown in FIG. 3b perform a cyclic process with no external intervention or control, and there is a good bit of feed back within the circuit. Open-collectors tied together to form a wire-or connection are employed. An example of this is pin 2 of inverter 343 and 12 of inverter 344 are tied together, so that if either of them goes low, pin 11 of inverter 352 will be brought low, and pin 10 of inverter 352 will go high. Exactly what these accomplish in the present application will be discussed below.

It is easiest to describe the operation of the transmitter if one looks at it in the middle of a cycle. (7473) dual J-K flip-flops 514 pin 9 will be low, as this is the signal that comes high to indicate the end of a cycle. DTAC, the signal at nand 213 pin 3 will be low, holding inverter 346 pin 10 high, so that the signal at inverter 354 pin 5 will depend only on the output at inverter 345 pin 3. Similarly, by propogation through nand 212 pin 4–6, inverter 355 pin 9 to 8, to inverter 344 pin 13, holds inverter 344 pin 12 high, so the input to inverter 352 pin 11 will depend only on the input at inverter 343 pin 1. Element 515 is a one-shot (74123) that fires only when CMPLT (complete) comes high at the end of a cycle, so its output at pin 4 is high in the middle of a cycle, thereby enabling nand gate 203 through pin 12, so that nand 203 pin 11 is the inverse of nand 283 pin 13.

The basic data rate is determined by timer 509, a free-running (555) timer with approximately a 5 KHz output. This signal is applied to 510, a (74123) one-shot which fires on the rising edge of the clock signal. The output of element 510 is a series of pulses about 5000 per second. In the middle of a cycle, the output of element 510 is effectively only at 203 pin 13, since the other places where the output goes (pin 10 of nand 204 and pin 5 of nand 212) are disabled as described in the previous paragraph. The duration of the CLK (clock) pulse is about 40 microseconds, or one-fifth of a clock period. Each pulse is inverted by nand 203 to be presented to inverter 351 pin 1 and pin 10 of a (74123) dual retriggerable monostable multivibrator with clear element 511, (the latter being delayed slightly by the resistor-capacitor input filter 597 and 598.) The resulting positive pulse output from inverter 351 pin 2 does three things: it causes counter 512 (7493) to count once (512 is a divide by 16 counter); it causes the string of data registers 501-508 to shift once; and through the wired-or pair 343–344 is sent to remote member 2 as the TMG (timing) signal by a (75110) differential transmitter 517. When the pulse ends, its trailing edge fires the one-shot element 511 through pin 10. This one-shot element 511 has a pulse of length about 120 microseconds, occupying the major portion of the time between clock pulses, but not overlapping with any clock pulse. While this pulse, DTASMPL, (from element 511 pin 5) is high, the output from nand 211 pin 8 will be the inverse of the data from the register, and with three subsequent inversions in inverters 353, 345, and 354 is sent to remote member 2 as a positive pulse if register data was high, or as no pulse is the register data was low.

Thus the outputs to remote display element 2 as shown in the timing diagram FIG. 5a during the transmission cycle, a series of clocking pulses on the TMG line, with pulses interspersed between them on the DTA (data) line, depending on the pattern of lows and highs that were loaded into the transmission registers as the cycle began. It will be noted from FIG. 5a that the two lines are never high together at the microseconds, time during a cycle. This is important, as this is the special condition that will be generated when the cycle ends, telling the remote member 2 to latch the current string which has been completed.

Elements 512, 513, and 514 are counters (7473) which are cleared at the beginning of a transmission cycle. They keep track of how many times the transmission registers 501-508 are shifted. Counter 512 divides by 16, counter 513 divides by 4, counter 514 pin 9 comes high at the 64th shift pulse. When this happens, 515 pin 4, CLKBLK (clock Block, inverted) output of a one-shot (74125) fired by CMPLT, goes low for about 200 microseconds, long enough to hold nand 203 pin 11 high past the subsequent CLK pulse, and so there will be no pulse on the SHFTCLK line. CLK now functions through nand 204 pin 8 to set the DTAC (data complete) flip-flop comprised of nands 213 and 214. With DTAC high, two things happen; the DTA line to the remote element 2 is pulled high by operation of the other wire-or'ed inverter at 354 pin 5; and CLK (clock inverted) is allowed to propogate through to nand 212 pin 6, where it accomplishes several purposes. The propogation of CLK through nand 212 pin 6 is a little unusual, in that the two inputs at nand 212 pins 4 and 5, change state simultaneously, and so nand 212 pin 6 remains high until the end of the CLK pulse, when it becomes low, and does not return to its high state until the following CLK pulse commences. Consequently, with nand 212 pin 6 low, a high signal is sent along the TMG line to the remote display 2, concurrent with the high on the DTA line (from DTAC, previously discussed), and this concurrence of signals is the special condition that tells remote element 2 that a transmission cycle has ended. It will be noted that the high condition on DTA starts before the high condition on TMG, by the width of a full CLK pulse. This pulse on nand 212 pin 6 goes also to the shift registers 501-508 loading in a new string of data; and also to the counters 512-514 resetting them to zero, ready to start counting the next cycle. At the following CLK pulse, nand 212 pin 6 goes high, ending the high condition on TMG; and after a small delay, this low-to-high transition fires a one-shot element (74123) 516 at pin 10, the output of which clears the DTAC flip-flop comprising nands 213-214 ending the high condition on DTA. This sequence is shown in the diagram designated FIG. 5b. As shown in FIG. 5b, the TMG pulse is prolonged past the end of LD/SHFT (which is responsible for the bulk of it) because CLK pulse c is not stopped by CLKBLK, and so is propogated to the TMG line. Since LD/SHFT is still active at the beginning of pulse c, this edge does not shift the registers 501-508, as they are still being held in the load state. Hence, whether or not there is a pulse on the DTA line following CLK pulse c is determined by the first, and not the second bit in the string of data from the registers.

In remote element 2, in the embodiment shown (FIGS. 4a and 4b) is provided a receiver portion which takes the DTA and TMG signals as previously described, and generated appropriate signals to get the data string moved through a set of 8-bit parallel-out serial shift (74164) receiving registers 701-708 and to store same in a set of (7475) quad latches 711-726, to appropriately drive a set of lamp drivers 1001-1064 to form display members.

A 10 Hz transmitter circuit is provided in the embodiment shown in remote element 2. This location is not necessary, as it suitably could be also incorporated into control head 2 electronics.

A 60 Hz signal from a power supply 700 (FIG. 4a) is brought to a retriggerable multivibrator (74123) 494 pin 10 through a filter as shown comprized of 816-820. Elements 494 is a one-shot, and its output is a series of pulses, 60 a second. The purpose of this one-shop 494 is mostly interface between the roughly 0 to 15 volt swing of the power supply signal, and the 0 to 5 volt levels that are standard for the TTL logic. It also gives a reliable 60 Hz pulse string, eliminating noise on the input because pin 10 is a Schmidt trigger input to the device. The 60 Hz pulse string is delivered to element 495, a divide by 6 counter (7492). The output counter 7492 is fed directly to a (75110) differential transmitter, 496, which sends a resultant 10 Hz signal to control head 1.

The DTA and TMG signals are received by differential receiver 486 and outputted thereby as standard TTL levels. During a transmission cycle, as described, DTA and TMG are never high at the same time, and so nand 221 pin 3 is always high, since one or the other of its inputs is low. The DTA line is applied to the input of the register string directly, and a shift pulse is generated from the timing line directly as follows. The TMG signal is inverted by nand 223 pins 8, 9, and 10, which causes a one-shot (74123) retriggerable multivibrator 492 pin 5 to output a pulse starting at the trailing edge of the TMG pulse. This outputted one-shot pulse is about 50 microseconds long, and delays well into the data sample period. When it ends, a one-shot (74123) retriggerable multivibrator 493 pin 13 outputs a very short pulse (5 microseconds), shifts the DTA line into shift registers 701-708 that receive the string of data. If there was a pulse on the DTA line following the TMG pulse, then a high level will be shifted into the registers 701-708. If there was not, then a low level will be shifted into the registers 701-708. In this way the data string that was in the original transmitting registers 501-508 in the control head 1 is reconstructed. When the cycle ends, both DTA and TMG come high together, as discussed. This causes nand 221 pin 3 to go low, firing one-shot 491 pin 13. This signal causes the data string stored in the registers 701-708 to be loaded into (7475) quad latches, 711-726, where it is held constant while the next string is being received.

Since there are so many shift inputs and load latch inputs to be driven by the signals from the one-shots, the signals are "buffered" by nand gatecontaining driving buffers 301 and 302, capable of driving a large number of inputs without suffering attenuation that might cause errors.

As shown, 701-708 are 8-bit parallel output shift registers (74164). A bit is provided at input 701 pin 1 and with each subsequent shift pulse, appears first at 701 pin 3 then 701, pin 4, etc. Register 701, pin 3 and Register 707, pin 1 of FIG. 4a receive signals DTAA and DTAB as do Register 702, pin 1 and Register 706, pin 13, respectively, of FIG. 4b. When the string is shifted 64 times, aligned correctly in the shift registers, a LDLTCH, (load latch) signal causes the flip-flops in the latches 711–726 to take the state of their inputs, thereby storing the string while the next is received. The outputs of the latches 711–716 go directly to lamp drivers, which turn lamps 80, shown or other load shown as loads 1101–1064, FIG. 4a and 4b on or off, depending on the output of the corresponding latch, e.g., output GE from latch 715, and lamp driver element 1045 (a silicon controlled rectifier SCR, circuit) would control the energyzing of illumination elements 80 (also shown as load 1145, FIG. 4b) in segment E of the tens of minutes display member 11 in remote member 2. Such SCR-containing lamp drivers, are of the type shown in more detail in FIG. 4a as SCR 813, for the home bonus indicator light 21. For example, if the output MB of latch 726 pin 9 is low, the collector of transistors will go high, allowing current to flow from the 5 volt supply into the gate of the SCR (silicon controlled rectifier) 813, which causes it to conduct for positive half-cycles of the line voltage, and the bulbs comprising indicator 21 (load 1101) will turn on. If the output MB of latch 726 pin 9 is high, the collector of the transistor will be low, thereby shunting the gate current to ground, the SCR 813 will not conduct, and lamps 80 in indicator element 21 will be off.

What is claimed is:

1. An electronic, portable display device comprising
   1. a portable control member comprising a housing, a face panel on said housing, and a plurality of stationary electrically actuatable illumination elements adjacent to said face panel, said illumination elements being adapted, when energized to illuminate pre-determined segment areas of said face panel to define, by combinations of the resultant illuminated segment areas, indicia visible on said panel face,
   2. a portable, remote display member comprising a housing, a face panel on said housing, and a plurality of stationary electrically actuatable illumination elements adjacent to said face panel, said remote display illumination elements being adapted, when energized, to illuminate pre-determined segment areas of said remote display face panel to define, by a combination of said illuminatinated segment areas, indicia identical to selected indicia displayed on said control member face panel,
   3. first power circuit means having an output to said control member comprising a pulse having a frequency providing a timer signal,
   4. second power circuit means having an output to said control member comprising a pulse providing a binary data-carrying signal,
   5. circuit means, positioned in said control member, including:
      a. timer signal counter circuits adapted to receive an input signal from said timer circuit, and containing means for a binary counting of input signals thereto, and being adapted, on signal, to output the binary counting of input signals thereto, and being adapted, on signal, to output the binary data in the counter means thereof,
      b. a plurality of separate data signal counter circuits, each of said data counter circuits being adapted to receive an input signal from said second power circuit, each of said data signal counter circuits comprising means for the binary counting of the input signals thereto, and being adapted, on signal, to output simultaneously signals corresponding to the binary data in the counters thereof,
      c. decoding circuits adapted to receive output signals from said data signal counter circuits, said decoding circuits including recoding-circuits for converting signals received from said data signal counter circuits into re-coded binary data for which the segment illumination pattern-coding of said illumination elements in said face panel of said control member and remote display member produce indicia corresponding to set values of output signals from said data signal counter circuits, said decoding circuits being adapted, on signal, to output simultaneously signals corresponding to said decoded binary data,
      d. first latch circuits, said first latch circuits being adapted, to receive and store separately binary information transmitted thereto by simultaneous input signals and being responsive, on signal, to receive the outputs of said decoding circuits, and being adapted, on signal to serially output signals corresponding to binary data stored therein, as a data chain having a bit length corresponding to the number of said stored data bits therein,
      e. illumination element driving circuits adapted for receiving output signal from said decoding circuits, and, on signal, effecting the energizing of said illumination elements in said control member face panel,
   6. on-off manual switch means, positioned on the face panel of said control member for energizing and de-energizing each of said first power circuit, said second power circuit, said timer signal counter circuits, and said data signal counter circuits,
   7. circuit means, positioned in said remote display member comprising:
      a. signal receiver-register circuits adapted to receive and store separately information transmitted thereto in serial binary pulse bits, said signal receiver-register circuits to sense a peculiar signal indicating a receipt thereby of a complete binary data chain, and thereupon, to output binary data bits stored therein with simultaneous signals,
      b. second latch circuits adapted to receive and store binary data bits, said second latch circuit means being adapted to receive on signal simultaneous output signals of said signal receiver-register circuits and being adapted on signal, to output simultaneously signals corresponding to the binary data stored therein,
      c. illumination element driving circuits adapted for receiving output signals from said second latch circuits and, on signal, effecting an energizing of illumination elements in said remote member face panel,
   8. transmitter means for simultaneous transmitting timing signals to said signal receiver-register circuits and, by serial transmission, binary data containing output signals from said first latch circuits to said signal receiver-register circuits, and said binary data-containing signal, when said serial transmission is complete to effect signal outputs from said signal receiver-register circuits.

2. The portable display device according to claim 1 wherein said remote display member is collapsible into an enclosed, portable container.

3. The portable display device according to claim 2 wherein said remote display member housing comprises at least two separate housing components, connectable in series whereby a face panel of each of said separate housing component displays indicia corresponding to at least a portion of said data transmitted to said remote display member from said control member.

4. The portable display device according to claim 1 wherein said transmitter means includes a cable link between said control member and said remote display member.

5. The portable display device according to claim 1 wherein the total weight of said control member and said remote display member is less than 75 pounds.

* * * * *